Feb. 20, 1951     A. M. MacFARLAND     2,542,934
DRY CELL CONSTRUCTION
Filed Nov. 14, 1945
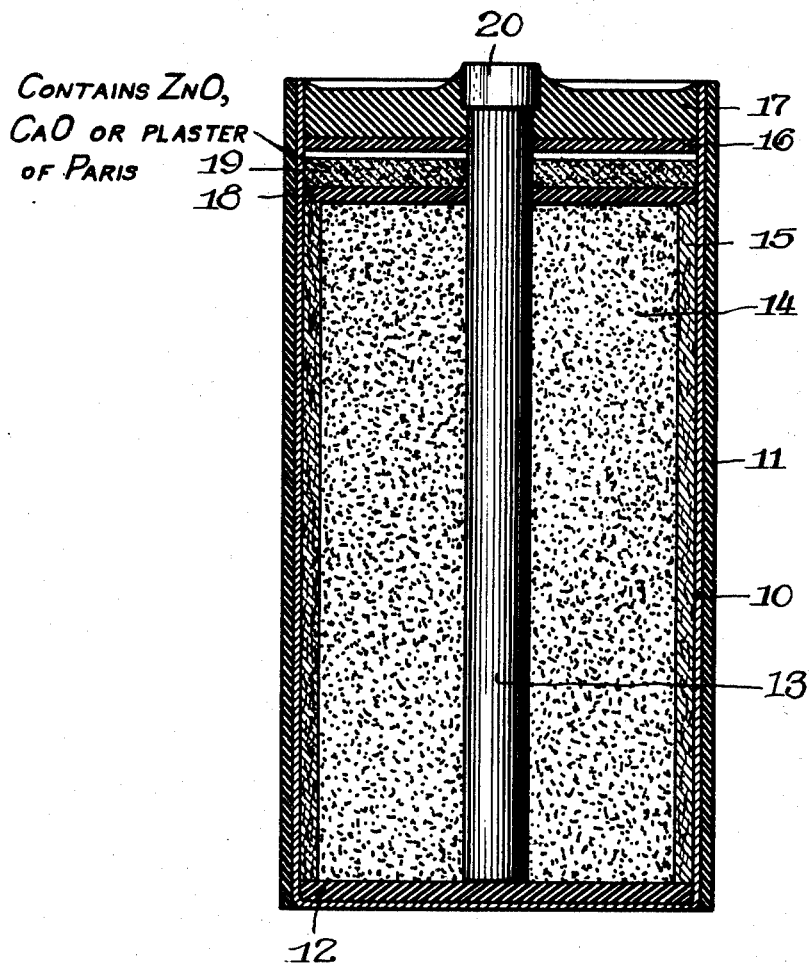
INVENTOR.
Allison M. MacFarland
BY
Tesch and Darbo, Attys.

Patented Feb. 20, 1951

2,542,934

UNITED STATES PATENT OFFICE 2,542,934

DRY CELL CONSTRUCTION

Allison M. MacFarland, Freeport, Ill., assignor, by mesne assignments, to Burgess Battery Company, Freeport, Ill., a corporation of Delaware Application November 14, 1945, Serial No. 628,559

4 Claims. (Cl. 136—133)

This invention relates to dry cells and particularly to improvements in dry cell structures which are adapted to reduce the tendency of the cell to leak.

It is common experience that dry cells frequently develop leaks when subjected to heavy current drain or after they have been in service for a considerable period of time. One of the factors which is responsible for this tendency is the increase in volume of liquid which takes place at the active surface of the anode with use or age. At the time of manufacture, the cell is provided with a predetermined amount of aqueous electrolyte liquid, distributed in a predetermined manner, and the chemical or electro-chemical action which the cell undergoes thereafter has the effect of increasing the volume of liquid at the active surface of the anode, which liquid accumulates under certain conditions of use and is one of the principal causes of the leakage which is frequently encountered and which causes corrosion and impairment of flashlight cases and the sticking of cells in such cases.

It is the primary object of the invention to provide an improved dry cell construction in which the tendency to leak liquid is greatly reduced.

Specifically, it is the object of the invention to provide an absorbent member in the dry cell which absorbs excess liquid when it accumulates in an undesired manner in the cell.

Another object of the invention is to provide an absorbent element in a dry cell which, in addition to absorbing excess liquid, has the effect of fixing such liquid by forming with it a rigid or immobile product. As a result, it is not possible for the immobile liquid to leak out of the cell.

A further object of the invention is to provide means for initially separating the absorbent element from the liquid electrolyte and maintaining the absorbent element out of contact with the electrolyte until the action of the cell causes the liquid to expand a substantial amount, when the separating means allows the expanding liquid to come into contact with the absorbent element and be absorbed and immobilized.

Further objects and advantages will become apparent as the following description progresses.

In the accompanying drawing, the single figure is a vertical sectional view of the dry cell of the present invention.

The construction illustrated in the figure is a Leclanche type dry cell consisting of an open-top, cylindrical, cup-shaped zinc anode 10, which serves as a container for other elements of the cell as well as an electrode. The electrode 10 may be laterally enclosed by an open-ended cylindrical jacket 11 of electrically non-conductive material, such as heavy paper or pulpboard which leaves the bottom of the electrode 10 exposed whereby it may serve as a terminal of the cell. Upon the bottom of the metal electrode 10 is a disk-shaped member 12 of electrically non-conductive and electrolyte resisting material, such as paper board or pulpboard, synthetic resin, or the like. A generally rod-shaped carbon electrode 13 is disposed centrally within the metal electrode 10 and at its bottom rests upon the non-conductive member 12. A metal conductive cap 20 fits tightly over the top end of the carbon electrode 13 and serves as the other terminal of the cell. The electrode 13 is surrounded by a compressed body 14 of depolarizing material, which may be composed of the usual substances, such as powdered maganese dioxide and carbon or graphite. Between the depolarizing body 14 and the metal electrode 10 is a bibulous, non-conductive separating member 15, composed, for example, of porous blotting paper or gelatinized starch, moistened with a liquid chloride-containing electrolyte, which may be an aqueous solution of ammonium chloride and zinc chloride. The depolarizing body 14 is also moistened with the liquid electrolyte. The depolarizing body 14 and separating member 15 rest at their lower ends upon non-conductive layer 12 and terminate at their upper ends at the same level which is substantially below the top edge of the metal electrode 10.

A washer 16 of electrically non-conductive and electrolyte resisting material, such as paraffin impregnated paperboard or pulpboard, fits snugly about the upper portion of the carbon electrode 13 and against the interior surface of metal electrode 10. A seal closure 17 for the cell is arranged upon washer 16 and may be composed of fusible wax or pitch poured into place in the molten condition. Spaced below washer 16 and resting upon the upper surfaces of depolarizing body 14 and separating member 15 is a second washer 18 which fits snugly about the carbon electrode 13 and against the interior surface of the metal electrode 10. The washer 18 may be composed of a material similar to that of washer 16.

In accordance with the present invention, there is disposed in the space between washers 16 and 18 a liquid absorbent member 19 which is adapted to absorb cell liquid when the latter expands or creeps into contact therewith.

The absorbent member 19 is a mass composed of a powdered absorbing and immobilizing agent mixed with particles of a non-hardening material, which may be powdered or fibrous in character. The absorbing and immobilizing agent is a substance which is adapted to readily absorb the expanding liquid of the dry cell and to form with it an immobile product. The expanding liquid is an aqueous solution containing zinc chloride, and for the absorbing and immobilizing agent, zinc oxide has been found to be excellent. It absorbs the liquid readily and forms with it a solid hard product. Other substances which may be used are hydrated lime and plaster of Paris. The substance is preferably in the form of a powder because in this form it exhibits greater absorbing capacity than if it is in larger particles. However, it may be in the form of lumps or any other form which is desired. Upon absorbing liquid, it exhibits a tendency to cake together and form a hard, relatively impervious shell upon the surface, which renders the absorbent underneath inaccessible to the liquid. The material is, therefore, preferably mixed with a non-hardening agent, that is, a powdered or fibrous material which does not form a surface shell upon the absorption of cell liquid, whereby the particles of the first material are separated and the tendency to form a hard surface shell is resisted. The non-hardening agent is preferably liquid absorbent and inert to the expanding liquid. It may be composed of fibers, such as cotton, wood, or other cellulose fibers, powdered diatomaceous earth, silica gel, absorbent aluminum oxide, and the like. It may also be a substance which is substantially non-absorbent, such as powdered silica, cement, talc, carbon, coal, or the like.

The absorbent member 19 may also be in the form of a shaped body. For example, it may be a shaped washer composed of cotton or wood fibers impregnated with powdered zinc oxide. The fibers and zinc oxide may be suspended in water to form a slurry and felted out into a thick sheet and dried in accordance with paper making procedure, and then cut into washers of the proper size. In this form, the member 19 consists of a porous liquid absorbent body of fibers containing the zinc oxide absorbing and immobilizing agent in the pores thereof.

The proportions of the two materials are not critical. Preferably, sufficient of the non-hardening agent is used to effectively prevent the formation of a surface shell by the absorbing and immobilizing agent. For example, satisfactory results are obtained with a mixture composed of 2 parts by volume of zinc oxide and one part of diatomaceous earth. The same proportions may be used with a mixture of zinc oxide and cellulose fibers.

In operation, the washer 18 serves to separate the electrolyte liquid in the separating layer 15 from the absorbent body 19, whereby the electrolyte is not absorbed but remains in said layer 15 where it is required for the successful operation of the cell. Such condition continues until the action of the cell causes the formation of liquid at the interior surface of the zinc electrode 10. The liquid formed is a strong zinc chloride solution, and it does not pass through the separating member 15 and into the depolarizing body 14, but creeps upwardly along the interior surface of the zinc electrode 10. The washer 18 does not form a liquid tight joint with the zinc electrode 10, and the expanding liquid passes upwardly between the washer and the surface of the zinc electrode and into contact with the absorbent member 19. Some of the liquid may also travel laterally along the top of the depolarizing body 14 to the carbon electrode 13 and pass upwardly between the surface of the latter electrode and the washer 18 and into contact with the absorbent member 19. The upwardly expanding liquid is absorbed and immobilized by the member 19, and is thereby prevented from producing deleterious effects upon the cell. The electrolyte in the layer 15 is not depleted, and the functioning of the cell is not impaired, by the absorbing action of the member 19. The action affects only the excess liquid, which is formed at the surface of the zinc electrode 10 and creeps upwardly. This is one of the principal sources of the objectionable leakage which is frequently encountered with ordinary cells. In the cell of the present invention, such excess liquid is held in an immobile state, and the tendency to leak is much less than in the ordinary cell.

Only a single embodiment of the present invention has been described and illustrated, but this is by way of example only and the invention may be incorporated in cells which differ therefrom in character and physical structure.

What is claimed is:

1. In a dry cell of the Leclanche type having a container and a liquid electrolyte in said container, an absorbent element in said container initially out of contact with said electrolyte and in the path of expanding liquid in said container, said absorbent element being from the group consisting of zinc oxide, hydrated lime and plaster of Paris.

2. In a dry cell of the Leclanche type having a container and a liquid electrolyte in said container, an absorbent element in said container initially out of contact with said electrolyte and in the path of expanding liquid in said container, said absorbent element comprising particles of a substance from the group consisting of zinc oxide, hydrated lime and plaster of Paris, and particles of a non-hardening substance intermixed with said particles of absorbent element.

3. In a dry cell of the Leclanche type having a container and a liquid electrolyte in said container, an absorbent element in said container initially out of contact with said electrolyte and in the path of expanding liquid in said container, said absorbent element comprising a porous liquid absorbent body containing in the pores thereof an agent from the group consisting of zinc oxide, hydrated lime and plaster of Paris.

4. In a dry cell of the Leclanche type having a container and a liquid electrolyte in said container, a quantity of zinc oxide in said container initially out of contact with said electrolyte and in the path of expanding liquid in said container.

ALLISON M. MacFARLAND.

REFERENCES CITED

The following references are of record in the file of this patent:

UNITED STATES PATENTS

| Number | Name | Date |
|---|---|---|
| 423,335 | Moorthamers | Mar. 11, 1890 |
| 1,086,710 | Hoopes | Feb. 10, 1914 |
| 1,331,761 | Hazelett | Feb. 24, 1920 |
| 1,509,650 | Heise | Sept. 23, 1924 |
| 1,657,543 | Lynn | Jan. 31, 1928 |
| 2,294,427 | Spicer | Sept. 1, 1942 |
| 2,331,450 | Baum | Oct. 12, 1943 |
| 2,332,456 | McEachron et al. | Oct. 19, 1943 |
| 2,399,127 | Lipinski | Apr. 23, 1946 |

FOREIGN PATENTS

| Number | Country | Date |
|---|---|---|
| 1,141 | Great Britain | of 1892 |